UNITED STATES PATENT OFFICE.

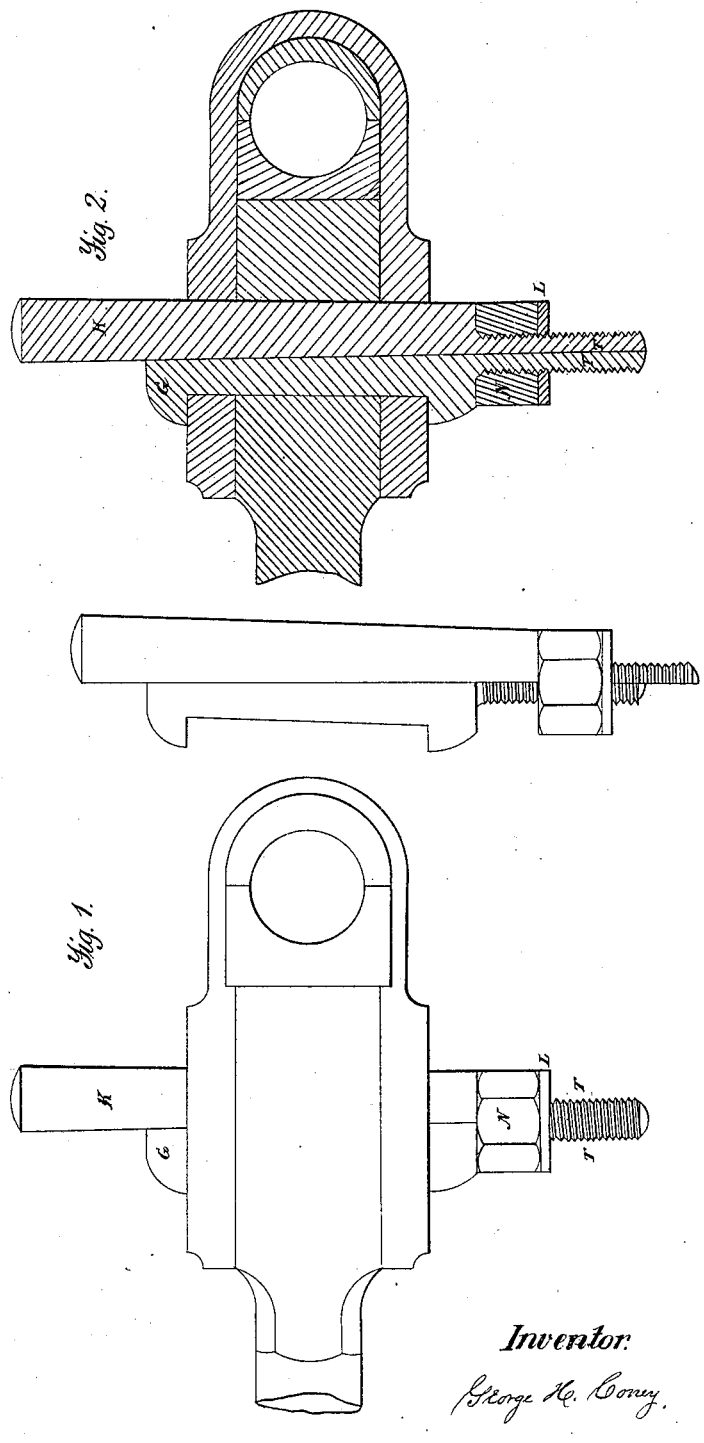

GEO. H. CONEY, OF BOSTON, MASSACHUSETTS.

METHOD OF SECURING KEYS IN CONNECTING-RODS, &c.

Specification of Letters Patent No. 13,541, dated September 11, 1855.

*To all whom it may concern:*

Be it known that I, GEORGE H. CONEY, of Boston, in the county of Suffolk and State of Massachusetts, have invented a new and Improved Mode of Fastening Keys in Connecting-Rods or other Places Where Keys Are or May be Used; and I do declare that the following is a full, clear, and exact description of the construction and operation of the same, reference being had to the annexed drawings, making a part of this specification, in which—

Figure 1 is a longitudinal elevation, and Fig. 2 is a vertical section through the line A, B, on Fig. 1.

Like letters refer to like parts.

K is a key.

G is a gib.

N is a nut.

L is a washer made of leather or any other similar substance.

T, T, are threads of a screw cut upon the ends of the key and gib, one half of said screw proceeding from the end of the key, and one half from the gib.

The mode of adjustment is as follows, viz: When the key is to be moved the nut is removed and the key is moved as far as is necessary, the threads on the two halves of the screw being made to coincide with each other, then the nut is again put on. This nut should be so fitted that it can be turned with the fingers, for convenience in adjustment. A second nut or a piece of leather may be screwed up to the nut (N) to prevent it from coming off; or a hole may be drilled in the end of the key and a pin inserted.

The operation is as follows, viz: The screw-threads in the nut (N) embracing the two halves of the screw (T, T), by fitting and bearing against the threads of the said screw operate to prevent one part of it from slipping by the other, and the key is thus prevented from moving from the place to which it may be adjusted.

What I claim as my invention, and desire to secure by Letters Patent is—

The combination of a screw-nut, and a screw divided longitudinally, as described, as a means by which to hold the key in its place.

GEORGE H. CONEY.

Witnesses:
ISAAC ADAMS,
J. AVERY RICHARDS.